(12) United States Patent
Sue et al.

(10) Patent No.: US 6,952,357 B2
(45) Date of Patent: Oct. 4, 2005

(54) POWER SUPPLY CONTROL APPARATUS

(75) Inventors: Hiroki Sue, Kanagawa (JP); Masanori Ohtsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 10/633,037

(22) Filed: Aug. 4, 2003

(65) Prior Publication Data

US 2004/0027110 A1 Feb. 12, 2004

(30) Foreign Application Priority Data

Aug. 8, 2002 (JP) ........................................ 2002-230833

(51) Int. Cl.⁷ .............................. H02M 5/42; G05F 1/70
(52) U.S. Cl. ........................ 363/89; 323/207; 315/119
(58) Field of Search .......................... 363/73, 89, 34, 363/16, 19, 97, 56, 98; 323/222, 207, 229, 285; 315/219, 205, 121

(56) References Cited

U.S. PATENT DOCUMENTS

| | | | |
|---|---|---|---|
| 5,106,191 A | 4/1992 | Ohtsuka | 356/349 |
| 5,170,217 A | 12/1992 | Nishimoto et al. | 356/359 |
| 5,598,092 A | 1/1997 | Ohtsuka et al. | 323/222 |
| 5,615,098 A * | 3/1997 | Ishii et al. | 363/84 |
| 5,726,871 A * | 3/1998 | Choi | 363/89 |
| 5,809,315 A * | 9/1998 | Ohtsuka | 713/323 |
| 5,982,106 A * | 11/1999 | Bobel | 315/209 R |
| 6,222,746 B1 * | 4/2001 | Kim | 363/89 |

* cited by examiner

Primary Examiner—Rajnikant B. Patel
(74) Attorney, Agent, or Firm—Fitzpatrick, Cella, Harper & Scinto

(57) ABSTRACT

An electric power supply control apparatus, which starts an interruption process upon detecting a voltage lower than a predetermined voltage, then detecting the electric power supply voltage again and, in case the predetermined voltage is recovered, does not execute a self resetting, thereby continuing a device control without executing a resetting operation in a situation where the electric power supply voltage is actually not lowered thereby not causing an erroneous operation of control means.

10 Claims, 6 Drawing Sheets

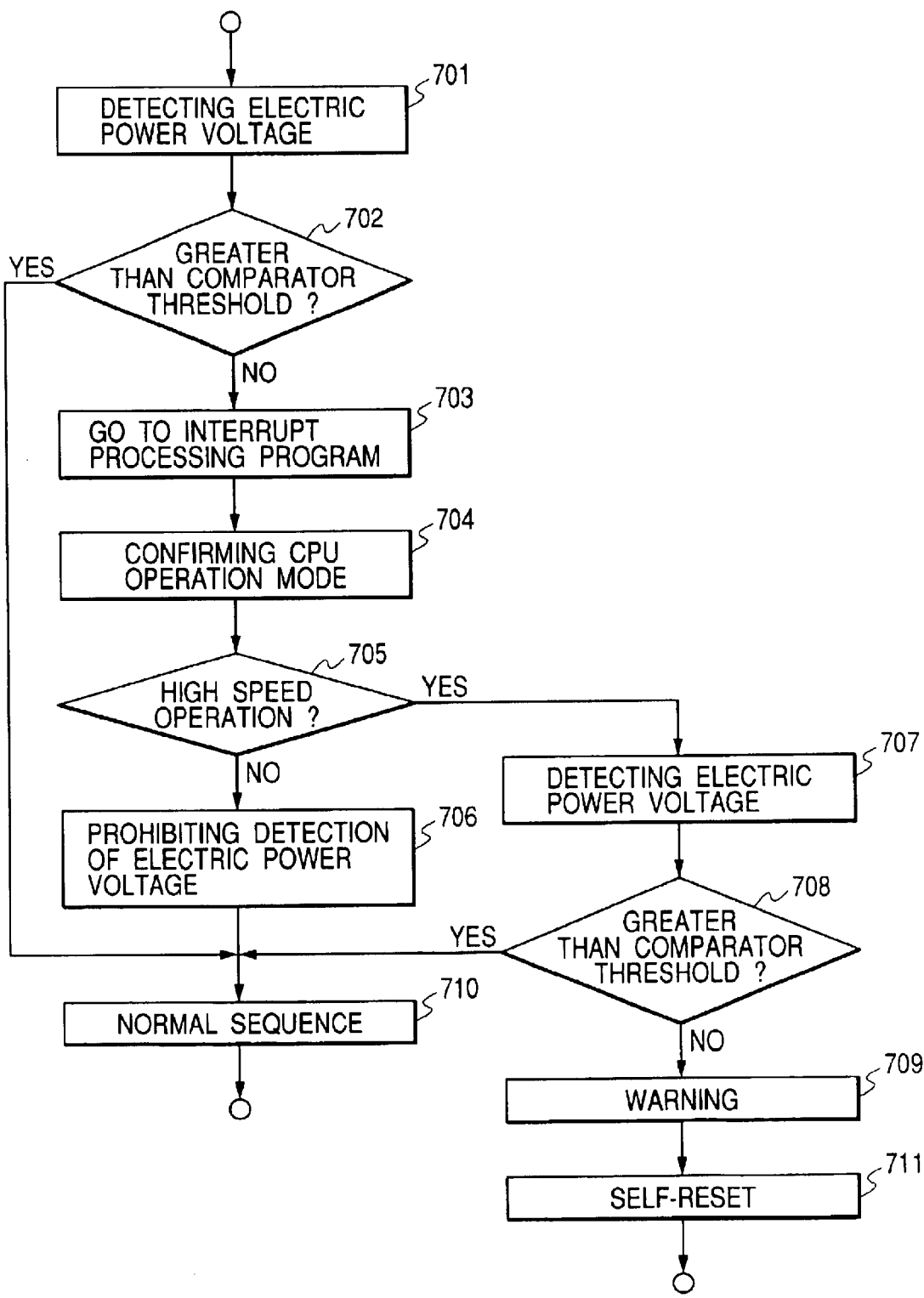

POWER SUPPLY CONTROL APPARATUS

BACKGROUND OF THE INVENTION

1. Field of the Invention

The present invention relates to an electric power supply control apparatus capable of executing an interruption process in case an electric power supply voltage is lower than a predetermined voltage, thereby achieving a self resetting.

2. Related Background Art

Mobile devices such as a camera generally have various electronic control system, and control means such as a microcomputer is often employed in a circuit constituting such electronic control system. Also the mobile devices such as a camera usually employ a battery as a power supply, and an electric power supply voltage elevated by an electric power supply circuit such as a voltage booster circuit is supplied to control means.

Such control means has, among operation modes, a high-speed operation mode of executing a predetermined high-speed operation with a high-speed clock signal of about 1 MHz to 100 MHz when an instantaneous operation, such as an image taking operation of a camera, is required. Such mode is capable of a high-speed operation but cannot be executed constantly because of a high current consumption. For this reason, in case of a control operation not requiring a high speed such as an update operation of a clock, if the camera is not operated, the control mode is shifted to a low-speed operation mode of operating the control means with a clock signal of less than 100 KHz, thereby suppressing the current consumption.

Thus, in the mobile device such as a camera, the control means usually has a high-speed operation mode and a low-speed operation mode.

Also in case the mobile device such as a camera is accidentally dropped, the internal battery may be instantaneously disconnected to cause a voltage drop, and, in such situation, the voltage booster circuit cannot maintain a constant voltage and also the electric power supply voltage for the control means becomes lower than a minimum operation voltage, whereby the control means becomes incapable of control.

In order to avoid such situation, a detection circuit for detecting the electric power supply voltage to the control means is externally provided with an output thereof being connected directly to a reset circuit of the control means to execute a direct hardware resetting or directly to an interruption port of the control means to execute a self resetting by a software, thereby preventing an uncontrollable situation.

However, in case the electric power supply voltage shows an instantaneous large change as spike noise for example due to an electrostatic charge, there may result a signal to be outputted into the electric power supply voltage detecting circuit even when the actual electric power supply voltage is not lower than the minimum operation voltage of the control means, or an interruption signal is generated into the control means even if the power supply voltage detecting circuit does not generate an output, thereby causing a hardware resetting or a self resetting of the control means by the software.

In case of such resetting, there may result a situation where the apparatus, which has been operating without any problem, returns to an initial state. As an example, in case a camera is reset by an electrostatic charge during a stand-by state, the date and time and various photographing data are reset to an initial state and the setting operation therefor has to be repeated again.

Also in case a resetting to an initial state occurs during a camera operation, for example during a zoom operation, the zoom operation is suspended in the course thereof to result in an extremely cumbersome situation. When such situation occurs frequently, the image taking operation itself is hindered.

On the other hand, in case the resetting is inhibited in order to avoid such situation, the control becomes impossible when the electric power supply voltage for the control means is actually lowered for example by a chattering of the battery of the mobile device.

SUMMARY OF THE INVENTION

The present invention has been made in consideration of the foregoing drawbacks, and, in order to continue the control of the apparatus without resetting in a state where the electric power supply voltage is not actually lowered and the control means does not operate erroneously. A first aspect of the present invention provides an electric power supply control apparatus includes an electric power supply voltage detecting device for outputting a result of comparison of an electric power supply voltage and a predetermined voltage, and a control device for controlling an object device and for executing a self resetting by executing an interruption process in response to a signal indicating that the electric power supply voltage is lower than the aforementioned predetermined voltage, provided from the power supply voltage detecting device, wherein the control device causes, in the interruption process, the electric power supply voltage detecting device to detect again the electric power supply voltage, and interrupts the interruption process to cancel the self resetting in case it is detected that the electric power supply voltage returns to the aforementioned predetermined voltage or higher.

According to a second aspect of the present invention, the electric power supply control apparatus of the present invention cancels the aforementioned interruption process only in case of a predetermined operation mode.

Other features of the present invention, and the features thereof, will become fully apparent from the following description which is taken in conjunction with the accompanying drawing.

BRIEF DESCRIPTION OF THE DRAWINGS

FIG. 7 is a flow chart showing the operation of a principal part of a camera constituting a third embodiment.

DESCRIPTION OF THE PREFERRED EMBODIMENTS

In the following, the present invention will be clarified in detail by embodiments thereof.

First Embodiment

Figure 1:
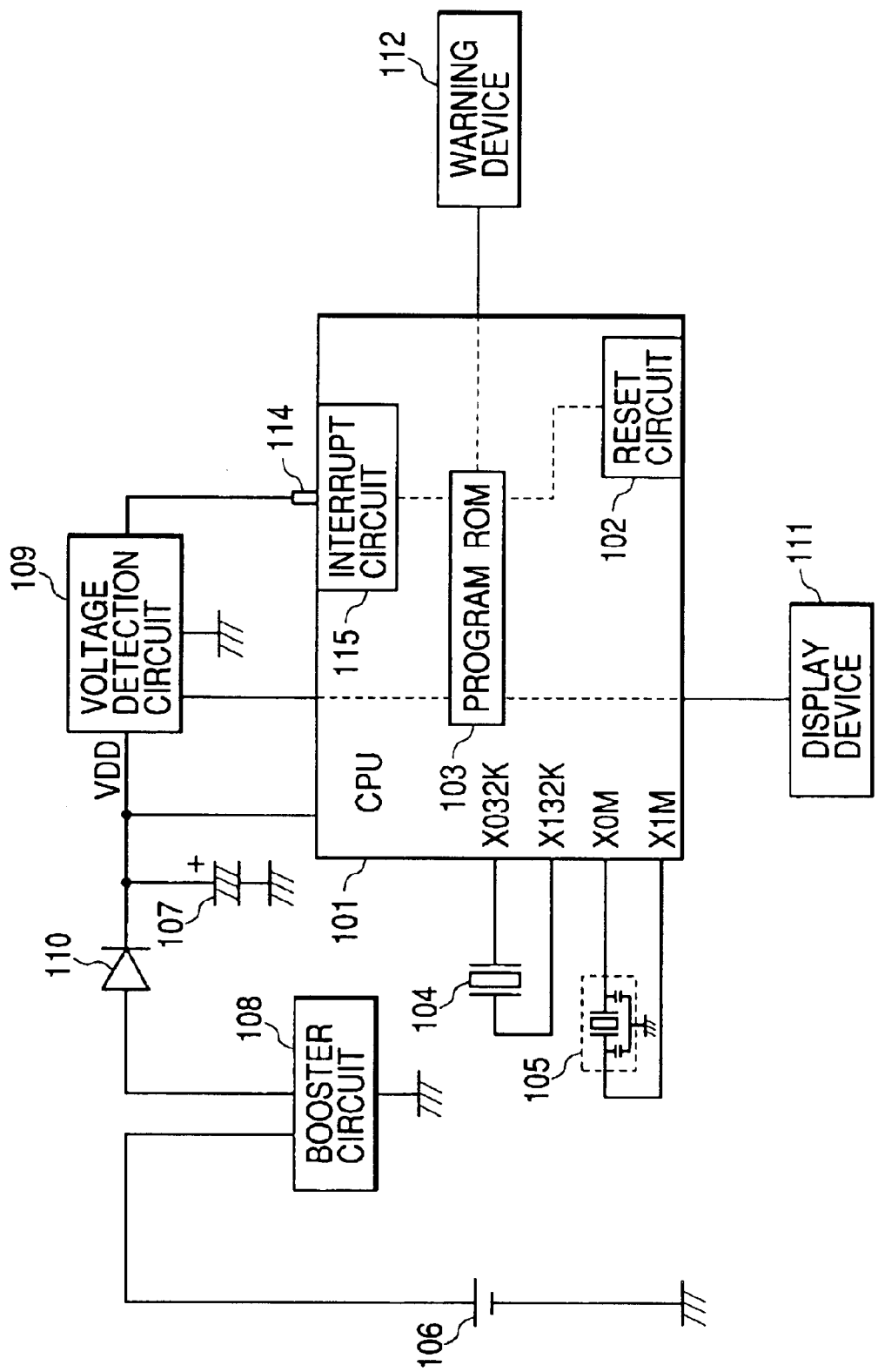
FIG. 1 is a block diagram showing a circuit configuration of a principal part of a camera constituting a first embodiment.

FIG. 1 is a block diagram showing a circuit configuration of a camera constituting a first embodiment of the present invention.

In FIG. 1, there are provided a controlling microcomputer (CPU) 101 for executing operations and sequence controls of the camera, a resetting circuit 102 for resetting the CPU 101, a program ROM 103 storing a camera sequence, a crystal oscillator 104 of 32 kHz for supplying a low-speed clock signal to an operational circuit not shown in the CPU 101 through ports X132K, X032K thereof and peripheral circuits, and an oscillator 105 of several MHz for outputting a high frequency clock signal for a high-speed operation of the CPU 101.

There are also provided a battery 106 constituting an electric power supply, an electric power supply backup capacitor 107, provided for avoiding an uncontrollable situation of the CPU 101 in case the battery is instantaneously disconnected during a high-speed operation of the CPU 101, a voltage booster circuit 108 for elevating the voltage of the battery, and a voltage detection circuit 109 for detecting the electric power supply voltage (hereinafter represented as VDD) outputted from the booster circuit 108, whose detecting operation is permitted or prohibited by the CPU 101. An output of the voltage detection circuit 109 is connected to an interruption port 114 of the CPU 101 to cause an interruption process circuit 115 of the CPU 101 to execute an interruption process when the electric power supply voltage becomes equal to or lower than a predetermined value. There are further provided a block diode 110 for blocking an inverse current from the voltage booster circuit 108, a display device 111 for displaying information of the camera, and a warning device 112 for giving a warning to a user of the camera.

Figure 2:
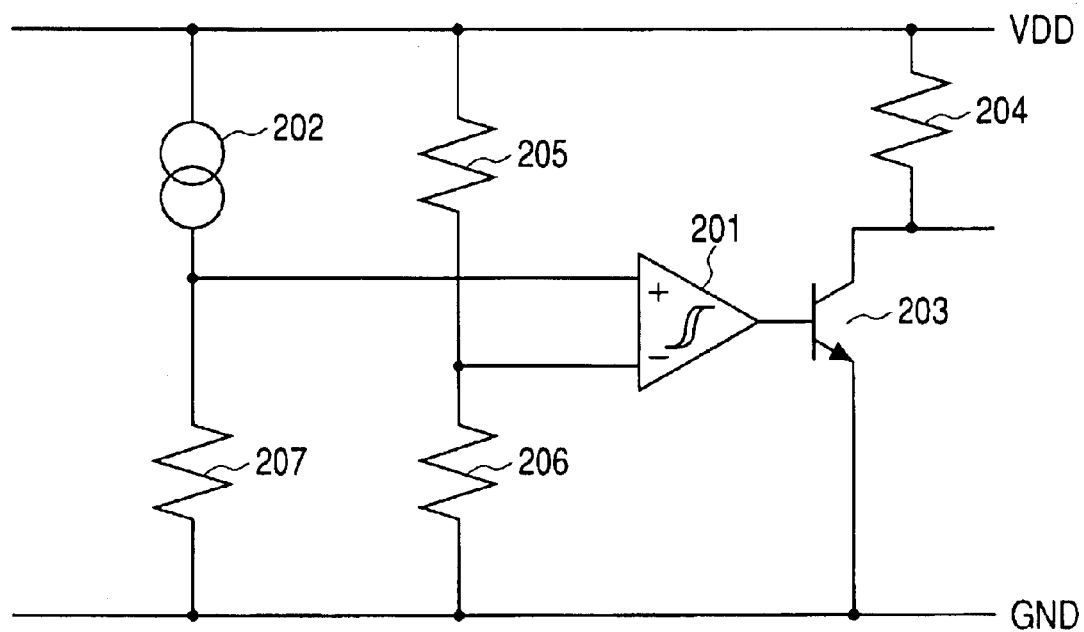
FIG. 2 is a circuit diagram showing an internal configuration of a voltage detection circuit.

FIG. 2 is a circuit diagram showing an internal configuration of the voltage detection circuit 109 shown in FIG. 1.

The voltage detection circuit 109 is constituted of a known comparator 201, a constant-current source 202, an output transistor 203, a pull-up resistor 204 therefor, bleeder resistors 205, 206 for dividing the voltage VDD, and a resistor 206 connected to the constant-current source 202.

When the electric power supply voltage (VDD) divided by the resistors 205, 206 becomes lower than a threshold value set by the constant current source 202 and the resistor 207, an output of the comparator 201 turns on the transistor 203, thereby sending an output signal as a reset signal to the interruption port of the CPU 101.

Figure 3:
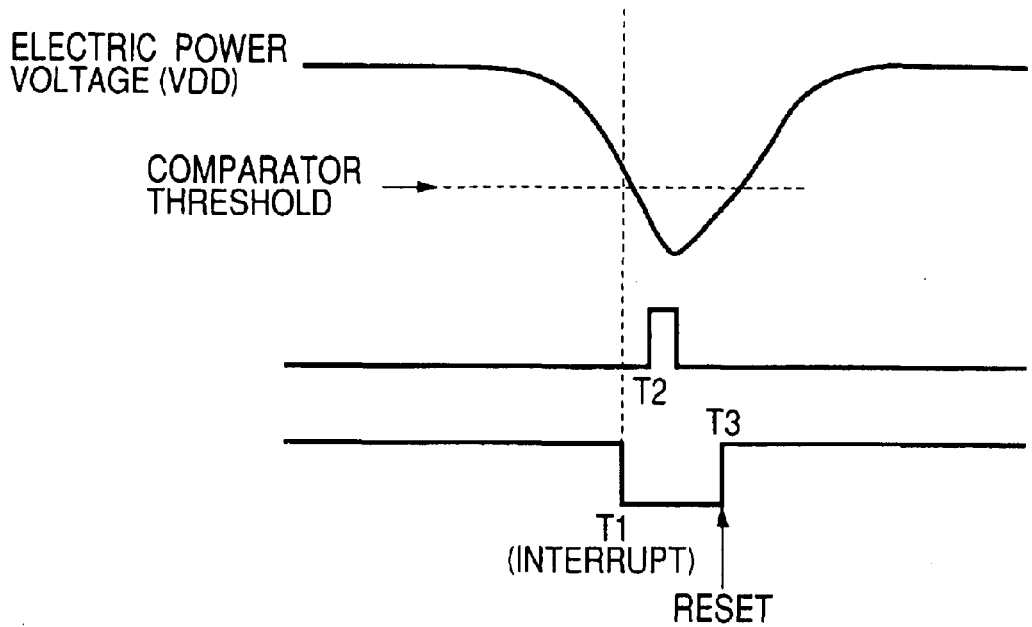
FIG. 3 is a chart showing a wave form in case a battery is instantaneously disconnected for example by a dropping of a camera.

FIG. 3 shows a signal wave form indicating a principal part of the present invention, showing a case where the electric power supply voltage (VDD) actually becomes lower than an operation guaranteeing voltage due to some cause such as an impact to the camera.

In such situation, in case a detected electric power supply voltage is lower than a predetermined threshold value of the comparator, a software interruption is executed at a timing T1 in response to a signal from the comparator 201, then a reconfirmation of the electric power supply voltage is executed at a timing T2 in the processing program, and, since the electric power supply voltage is lowered at this point, the CPU 101 enters a self reset state at a timing T3.

Figure 4:
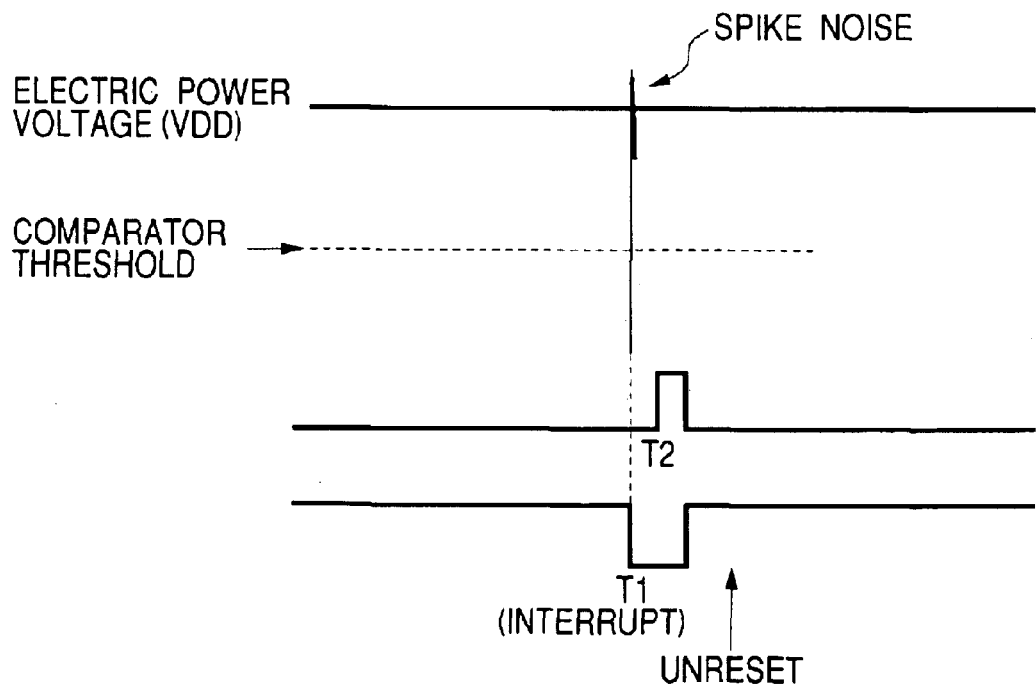
FIG. 4 is a chart showing a wave form in case a spike noise is generated due to an electrostatic charge.

FIG. 4 is a chart showing a case where the electric power supply voltage becomes lower than the threshold value of the comparator due to a spike noise such as an electrostatic discharge.

A spike noise due to an electrostatic charge is a noise of an extremely short time such as several tens of nanoseconds to several microseconds, and, in such case, even in a case an interruption process is activated in the CPU 101 at a timing Ti, the electric power supply voltage returns to the original voltage at a timing T2, so that the CPU 101 executes control so as not to execute a self resetting. Such operation will be explained in the following with reference to a flow chart shown in FIG. 5.

Figure 5:
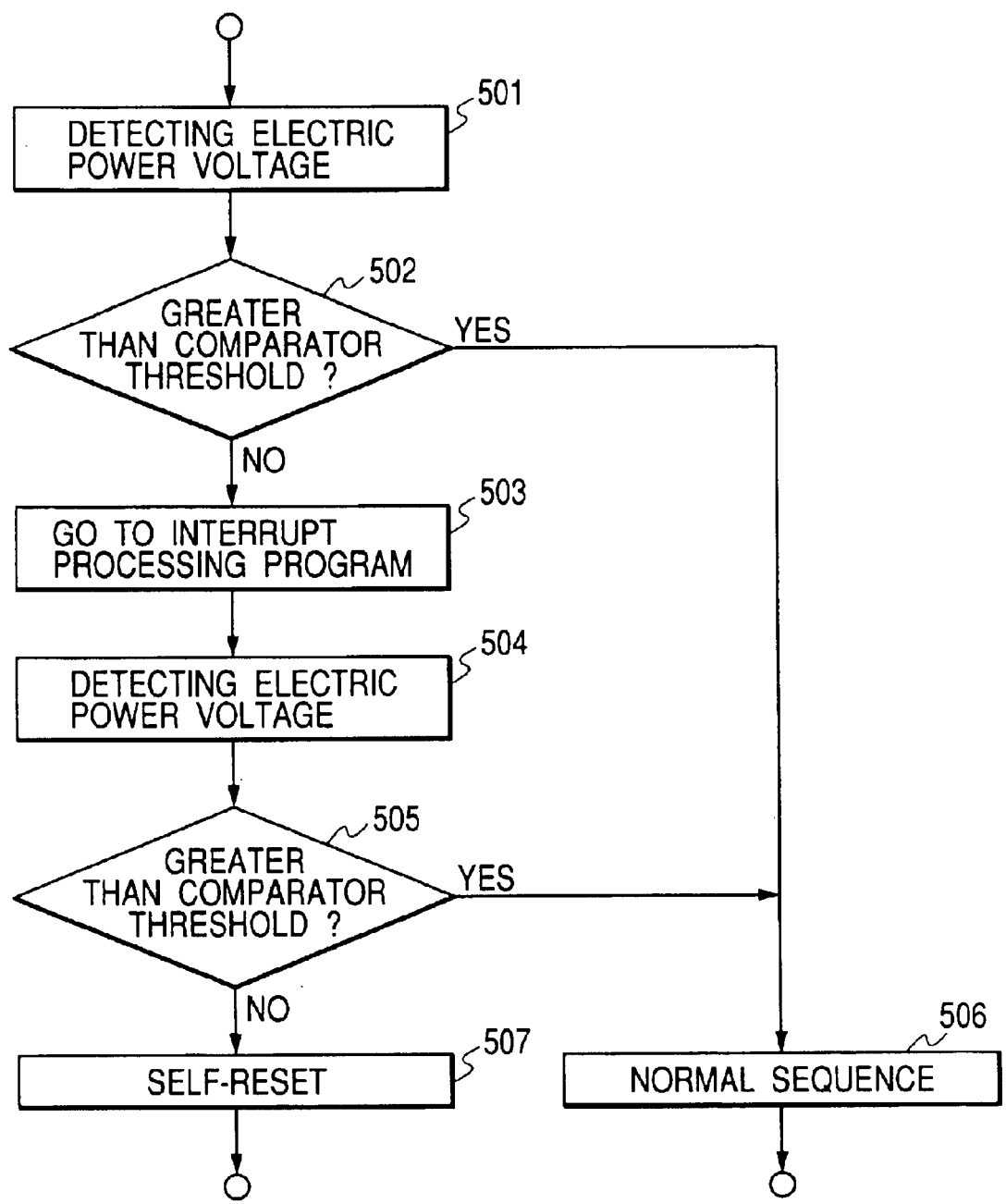
FIG. 5 is a flow chart showing the operation of a principal part of a camera.

FIG. 5 is a flow chart schematically showing an operation of the first embodiment of the present invention.

At first, in a step 501, the booster circuit 108 elevates a supply voltage to a predetermined value to supply an electric power supply voltage necessary for the CPU 101 of the camera, and the voltage detection circuit 109 is used to detect the electric power supply voltage. This operation is controlled by the CPU 101, and the voltage is constantly monitored during a normal sequence. A discrimination voltage level of this detection of the electric power supply voltage is selected slightly higher than a minimum operation voltage of the CPU 101, so that the electric power supply voltage becomes lower than the minimum operation voltage of the CPU 101 during the interruption operation.

In a next step 502, there is discriminated whether the detected electric power supply voltage is higher or lower than a predetermined voltage, and, if it is equal to or higher than the predetermined voltage (threshold value of comparator), the flow proceeds to a normal sequence in a step 506. On the other hand, if it is lower than the predetermined voltage, the flow proceeds to a step 503 to execute a software interruption process explained in FIGS. 3 and 4. In the prior art, a self resetting is executed in such interruption process, but, in a first embodiment of the present invention, a next step 504 causes the voltage detection circuit 109 to again detect the electric power supply voltage. Then in a next step 505, there is discriminated whether the detected electric power supply voltage is higher or lower than a predetermined voltage, and, if it is equal to or higher than the predetermined voltage, the flow proceeds to a normal sequence in a step 506. On the other hand, if the step 505 identifies that the electric power supply voltage is less than the predetermined voltage, the flow proceeds to a step 507 to execute a self resetting.

A period from the occurrence of the interruption process based on the output of the detection of the electric power supply voltage to the next detection of the electric power supply voltage is selected longer than a duration of a sudden noise such as a spike noise induced by an electrostatic charge or a trigger signal for strobe light emission.

In the above-described first embodiment of the present invention, for example in case the battery is instantaneously disconnected due to an impact of a camera dropping, a normal operation is executed in case the electric power supply voltage is not lower than an operation voltage of the camera depending on the duration of such disconnection (interval of T1 and T2 in FIGS. 3 and 4), but, in case the electric power supply voltage becomes lower than the operation voltage of the camera, the repeated voltage detection in the interruption process shows a value lower than the operation voltage, whereby a resetting can be executed before the CPU 101 becomes uncontrollable.

Also as explained in relation to FIG. 4, in case the CPU 101 does not become uncontrollable for example due to a spike noise of an electrostatic charge, the interruption signal is generated but the electric power supply voltage does not become lower than the operation voltage in the repeated voltage detection thereafter, so that the resetting is not executed.

The present invention is not limited to the above-described example. For example, the foregoing example executes two detections for the electric power supply voltage, but a similar effect can be obtained by executing the detection of the electric power supply voltage three times or more. Also the foregoing description is based on an electric power supply voltage obtained by elevating a battery voltage, but a similar effect can also be obtain in a system in which the power is supplied directly from a battery to the CPU 101.

Second Embodiment

Figure 6:
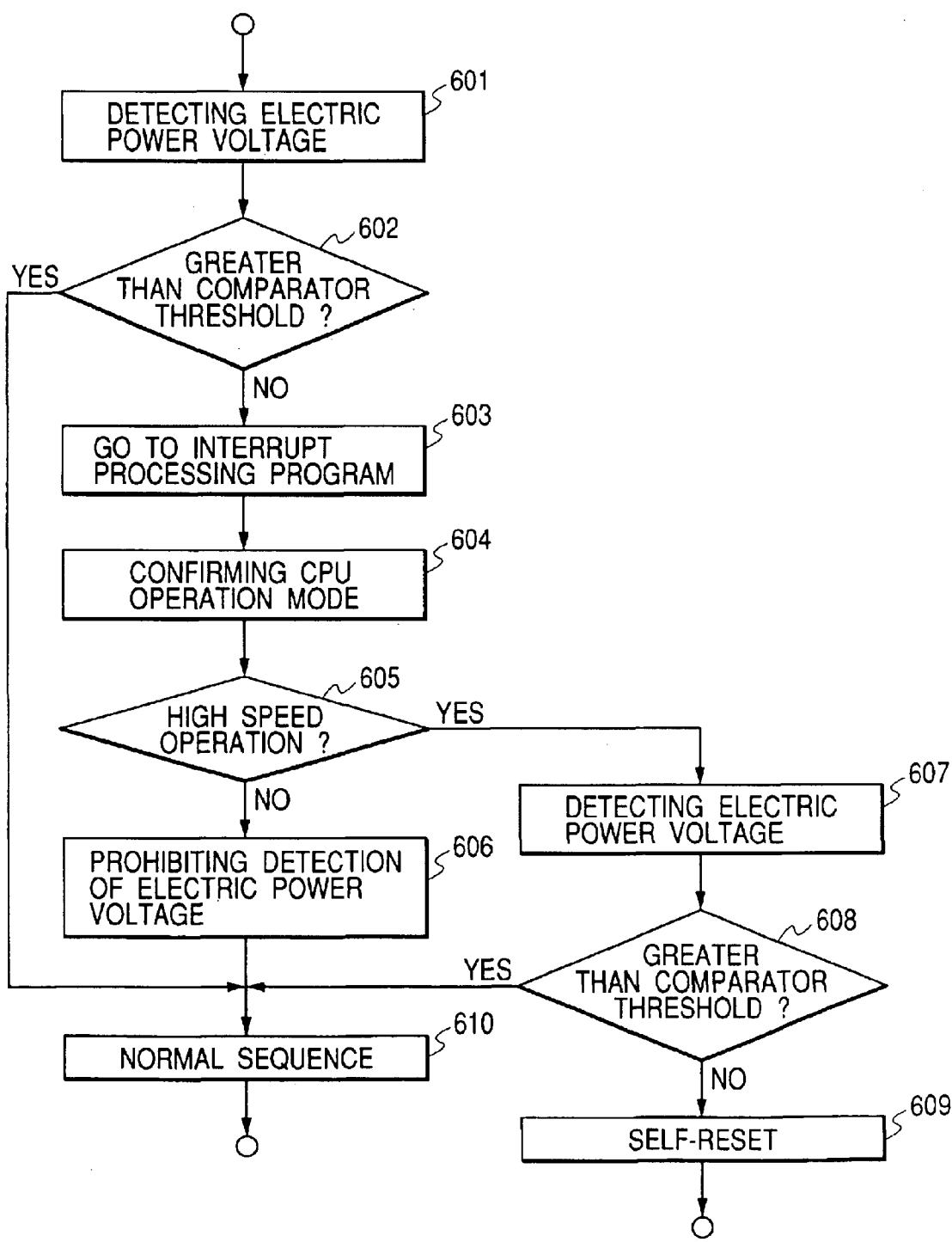
FIG. 6 is a flow chart showing the operation of a principal part of a camera constituting a second embodiment.

FIG. 6 is a flow chart schematically showing an operation of a principal part of a camera, constituting a second embodiment of the present invention. The configuration of circuit etc. is similar to the foregoing first embodiment and will not be explained further.

At first, in a step 601, the booster circuit 108 elevates a supply voltage to a predetermined value to supply an electric power supply voltage necessary for the CPU 101 of the camera, and the voltage detection circuit 109 is used to detect the electric power supply voltage. A discrimination voltage level of this detection of the electric power supply voltage is selected in such a manner that a voltage drop, determined from a backup capacity of the electric power supply and a current consumption thereof, does not become less than the minimum operation voltage of the CPU 101 within a period from the start of the interruption process by the CPU 101 to the start of the self resetting.

In a next step 602, there is discriminated whether the detected electric power supply voltage is higher or lower than a predetermined voltage, and, if it is equal to or higher than the predetermined voltage, the flow proceeds to a normal sequence in a step 610. On the other hand, if it is lower than the predetermined voltage, the flow proceeds to a step 603 to execute a software interruption process as explained in FIGS. 3 and 4. Then a next step 604 confirms, in the interruption program, whether the CPU 101 is in a high-speed operation mode or a low-speed operation mode, and, in case a next step 605 identifies that the CPU 101 is in the low-speed operation mode, the flow proceeds to a step 606 to prohibit the detection of the electric power supply voltage and proceeds further to a normal sequence in a step 610.

Also, in case the step 605 identifies that the CPU 101 is in the high-speed operation mode, the flow proceeds to a step 607 to detect again the electric power supply voltage. Then a next step 608 discriminates whether the detected electric power supply voltage is higher or lower than a predetermined voltage, and, if it is equal to or higher than the predetermined voltage, the flow proceeds to a normal sequence in the step S610. In case it is less than the predetermined voltage, the flow proceeds to a step 609 to execute a self resetting.

In the above-described second embodiment of the present invention, for example in case the battery is instantaneously disconnected due to an impact of a camera dropping, the control operation can be executed according to the operation mode of the camera. That is, in a high-speed operation mode (a operation mode in which a normal operation control cannot be executed if a current operation is continued, for example an image taking operation of the camera), the normal operation is executed in case the electric power supply voltage is not lower than an operation voltage of the camera depending on the duration of such disconnection, but a resetting can be executed before the CPU 101 becomes uncontrollable, since the repeated voltage detection in the interruption process shows a value lower than the operation voltage in case the electric power supply voltage becomes lower than the operation voltage of the camera. On the other hand, in a low-speed operation mode, for example in a stand-by state of the camera, the normal operation can be continued since the CPU 101 does not become uncontrollable until a hardware resetting is executed.

Also in case the CPU 101 does not become uncontrollable for example due to a spike noise of an electrostatic charge, in any operation mode, the resetting is not executed since even if the interruption signal is generated due to the noise, the electric power supply voltage does not become lower than the operation voltage in the subsequent voltage detection.

The present invention is not limited to the above-described example. For example, a similar effect can be obtained by setting plural discrimination levels for the voltage detection circuit 109 and changing the discrimination level depending on the operation mode of the CPU 101 (more specifically lowering the discrimination level in a low-speed operation).

Also a similar effect can be obtained by executing such setting by a software executed by the CPU 101 or by executing an automatic switching based on a hardware detection of the operation speed itself.

Furthermore, a similar effect can be obtained by permitting or inhibiting the interruption process itself of the CPU in accordance with the operation mode (more specifically, permitting the interruption in the high-speed operation mode and inhibiting the interruption in the low-speed operation mode).

Furthermore, a similar effect can be obtained by inhibiting the voltage detecting operation depending on the operation mode of the CPU 101 (more specifically, permitting the operation of the voltage detection circuit 109 in the high-speed operation mode and inhibiting the operation of the voltage detection circuit 109 in the low-speed operation mode).

Third Embodiment

FIG. 7 is a flow chart schematically showing an operation of a principal part of a camera, constituting a third embodiment of the present invention. The configuration of circuit etc. is similar to the foregoing first embodiment and will not be explained further.

At first, in a step 701, the booster circuit 108 elevates a battery voltage to a predetermined value to supply an electric power supply voltage necessary for the CPU 101 of the camera, and the voltage detection circuit 109 is used to detect the electric power supply voltage. Then a next step 702 discriminates whether the detected electric power supply voltage is higher or lower than a predetermined voltage, and, if it is equal to or higher than the predetermined voltage, the flow proceeds to a normal sequence in a step 710. On the other hand, if it is lower than the predetermined voltage, the flow proceeds to a step 703 to execute a software interruption process as explained in FIGS. 3 and 4. Then a step 704 confirms, in the interruption program, whether the CPU 101 is in a high-speed operation mode or a low-speed operation mode, and, in case a step 705 identifies that the CPU 101 is in the low-speed operation mode, the flow proceeds to a step 706 to inhibit the detection of the electric power supply voltage and proceeds further to a normal sequence in a step 710.

Also, in case the step 705 identifies that the CPU 101 is in the high-speed operation mode, the flow proceeds to a step 707 to detect again the electric power supply voltage. Then a step 708 discriminates whether the detected electric power supply voltage is higher or lower than a predetermined voltage, and, if it is equal to or higher than the predetermined voltage, the flow proceeds to a normal sequence in the step S710. In case it is less than the predetermined voltage, the flow proceeds to a step 709 to provide a warning for a self resetting by the display device 111 or the warning device 112, and then proceeds to a step 711 to execute a self resetting.

In the above-described third embodiment of the present invention, for example in case the battery is instantaneously disconnected due to an impact of a camera dropping, a control operation can be executed according to the operation mode of the camera. That is, in a high-speed operation mode (for example an image taking operation of the camera), the normal operation is executed in case the electric power supply voltage is not lower than an operation voltage of the camera depending on the duration of such disconnection, but a resetting can be executed before the CPU 101 becomes uncontrollable, since the repeated voltage detection in the interruption process shows a value lower than the operation voltage in case the electric power supply voltage becomes lower than the operation voltage of the camera. Also by an alarm display for the resetting, the user can recognize that the camera returns to the initial state, so that the user can execute for example a resetting of a date.

On the other hand, in a low-speed operation mode, for example in a stand-by state of the camera, the normal operation can be continued since the CPU 101 does not become uncontrollable until a hardware resetting is executed.

Also in case the CPU 101 does not become uncontrollable for example due to a spike noise of an electrostatic charge, in any operation mode, the resetting is not executed since even if the interruption signal is generated due to the noise, the electric power supply voltage does not become lower than the operation voltage in the subsequent voltage detection.

In the foregoing embodiments, in case the electric power supply voltage is lower than a predetermined voltage, the CPU 101 starts a software interruption process, then, in the course of such process, detects again the electric power supply voltage before executing a self resetting, and, in case the detected voltage is equal to or higher than the predetermined voltage, returns the sequence to a state prior to the interruption process. Therefore, the mobile device such as a camera can be used in continuation without resetting in case the electric power supply voltage is actually not lowered thereby not leading to an erroneous operation of the CPU 101, even if no major measure against the electrostatic charge is required.

Also in case of generation of an electrostatic discharge or an instantaneous noise, the electric power supply voltage becomes equal to or higher than the predetermined voltage at the repeated detection of the electric power supply voltage, whereby the resetting is not executed by a spike noise induced for example by an electrostatic charging and the there can be achieved a prevention of a trouble or an improvement in the usability.

Stated differently, it is rendered possible to continue the operation without executing a resetting in case the electric power supply voltage is actually not lowered thereby not inducing an erroneous operation of the CPU, even if no major countermeasure against the electrostatic charging is required, and to execute a proper resetting operation on the mobile device in case the electric power supply voltage is actually lowered to induce an erroneous operation in the CPU.

The foregoing embodiments have been explained by a camera, but such embodiments are not restrictive and are applicable to any mobile device having control means such as a CPU having a self resetting function.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electric power supply control apparatus comprising:
   an electric power supply voltage detecting device for outputting a result of comparison of an electric power supply voltage and a predetermined voltage; and
   a control device for controlling an object device and executing an interruption process to achieve a self resetting, upon receiving a signal from said electric power supply voltage detecting device, indicating that the electric power supply voltage is lower than said predetermined voltage;
   wherein said control device causes, in the interruption process, the electric power supply voltage detecting device to detect again the electric power supply voltage, and, in case the electric power supply voltage returns to said predetermined voltage or higher, terminates the interruption process thereby canceling the self resetting.

2. A control apparatus according to claim 1, wherein a time duration up to detecting again the electric power supply voltage by said electric power supply voltage detecting device in said interruption process is longer than a duration of an electrostatic discharge or a sudden noise.

3. A control apparatus according to claim 1, wherein said control means executes a self resetting, in case, as a result of the detecting again the electric power supply voltage by said electric power supply voltage detecting means in the interruption process, there is entered a signal indicating that the electric power supply voltage is lower than a predetermined voltage.

4. A control apparatus according to claim 1, wherein said predetermined voltage, which is a discrimination voltage of said electric power supply voltage detecting means, is so selected that a voltage drop, determined by a power supply backup capacity and a current consumption thereof, does not become lower than a minimum operation voltage of said control means within a period from a start of an interruption process by said control means to a start of a self resetting.

5. An electric power supply control apparatus comprising:
   an electric power supply voltage detecting device for outputting a result of comparison of an electric power supply voltage and a predetermined voltage; and
   a control device for controlling an object device and executing an interruption process to achieve a self resetting, upon receiving a signal from said electric power supply voltage detecting device, indicating that the electric power supply voltage is lower than said predetermined voltage;
   wherein said control device, upon starting an interruption process, confirmed whether a current operation mode is a predetermined operation mode, then, in case of the predetermined operation mode, causes the electric power supply voltage detecting device to detect again the electric power supply voltage, and, in case the electric power supply voltage returns to said predetermined voltage or higher, terminates the interruption process thereby canceling the self resetting.

6. A control apparatus according to claim 5, wherein said predetermined operation mode is a high-speed operation mode in which a normal control of the device cannot be executed if the device control is continued while a signal is entered from said electric power supply voltage detecting means, indicating that the electric power supply voltage is lower than said predetermined voltage.

7. A control apparatus according to claim 5, wherein the detecting again the electric power supply voltage by said electric power supply voltage detecting means is inhibited except in said predetermined operation mode.

8. A control apparatus according to claim 5, wherein said control device restarts a control for continuing the device control performed prior to the interruption process without detecting again the electric power supply voltage by said electric power supply voltage detecting means is not executed, except in said predetermined operation mode.

9. A control apparatus according to claim 5, wherein said control means executes a self resetting, in case, as a result of the detecting again the electric power supply voltage by said electric power supply voltage detecting means in the interruption process, there is entered a signal indicating that the electric power supply voltage is lower than a predetermined voltage.

10. A control apparatus according to claim 5, wherein said predetermined voltage, which is a discrimination voltage of said electric power supply voltage detecting means, is so selected that a voltage drop, determined by a power supply backup capacity and a current consumption thereof, does not become lower than a minimum operation voltage of said control means within a period from a start of an interruption process by said control means to a start of a self resetting.

* * * * *

UNITED STATES PATENT AND TRADEMARK OFFICE
CERTIFICATE OF CORRECTION

PATENT NO. : 6,952,357 B2 Page 1 of 1
APPLICATION NO. : 10/633037
DATED : October 4, 2005
INVENTOR(S) : Sue et al.

It is certified that error appears in the above-identified patent and that said Letters Patent is hereby corrected as shown below:

COVER PAGE:
(57) ABSTRACT, line 8, "lowered" should read -- lowered, --.

COLUMN 4:
Line 1, "Ti," should read -- T1, --

COLUMN 5:
Line 5, "obtain" should read -- obtained --; and
Line 56, "(a" should read -- (an --.

COLUMN 9:
Line 6, "again the" should read -- again of the --.

COLUMN 10:
Line 1, "again the" should read -- again of the --.

Signed and Sealed this

Twenty-fourth Day of October, 2006

JON W. DUDAS
*Director of the United States Patent and Trademark Office*